United States Patent [19]

Luzina

[11] 4,134,314

[45] Jan. 16, 1979

[54] METHOD FOR TRUING RAILROAD CAR WHEELS

[75] Inventor: Max Luzina, Erkelenz, Fed. Rep. of Germany

[73] Assignee: W. Hegenscheidt Gesellschaft mit beschraenkter Haftung, Erkelenz, Fed. Rep. of Germany

[21] Appl. No.: 772,950

[22] Filed: Feb. 28, 1977

[30] Foreign Application Priority Data

Mar. 4, 1976 [DE] Fed. Rep. of Germany ....... 2608940

[51] Int. Cl.$^2$ ........................... B23B 1/00; B23B 5/32
[52] U.S. Cl. ........................................ 82/1 C; 82/4 E; 82/8
[58] Field of Search .............................. 82/1 C, 8, 4 E

[56] References Cited

U.S. PATENT DOCUMENTS 3,347,117  10/1967  Luzina et al. .............................. 82/8
3,518,914   7/1970  Dombrowski et al. .................... 82/8

FOREIGN PATENT DOCUMENTS 1188588  4/1970  United Kingdom ........................... 82/8

*Primary Examiner*—Leonidas Vlachos
*Attorney, Agent, or Firm*—W. G. Fasse; W. W. Roberts

[57] ABSTRACT

Track wheels such as railroad wheels are trued or re-profiled by first turning or cutting over only a portion of the tread surface width of each wheel of a set, whereby the cutting depth for this initial turning is smaller than the cutting depth required for the truing. The diameters of the initially turned portions of both wheels of a set are then compared to provide a difference value. The lower diameter wheel is then turned in accordance with the respective lower diameter value. The higher diameter wheel, if any, is also turned in accordance with the lower diameter value plus in accordance with one half of said difference value.

2 Claims, 1 Drawing Figure

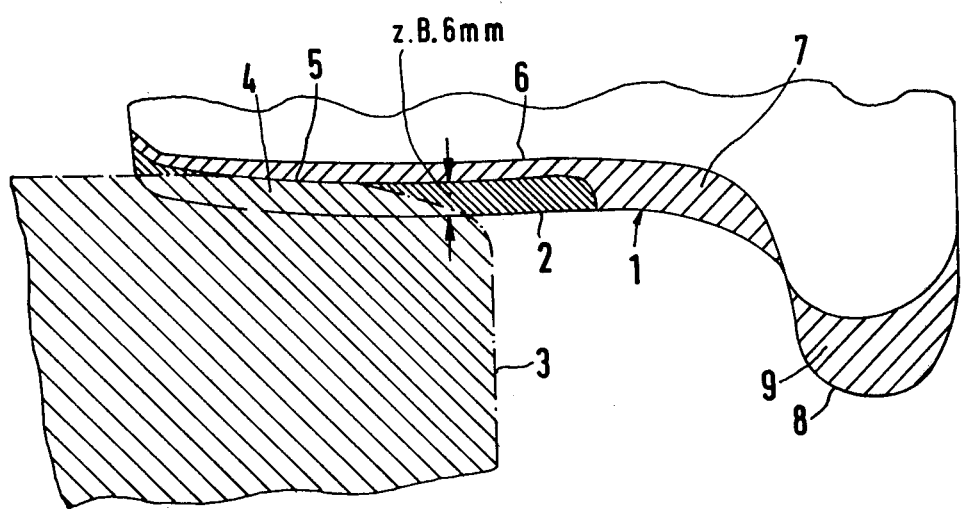

METHOD FOR TRUING RAILROAD CAR WHEELS

The invention relates to a method for reprofiling the wheels of railroad wheel sets by preferably simultaneous machining of the wheel profiles, formed by the tread and the flange surface of the wheels of a wheel set on a turning machine, particularly a below-floor turning machine, wherein each wheel is frictionally driven at the profile by preferably two rollers which are arranged at a mutual spacing and receive the wheel.

The tire profiles of the wheel sets of track vehicles are subject to greatly different wear at the tread surface as well as at the flange. There are wheel tires or hoops with predominant tread suface wear and such with predominant flange wear. Both types of wear occur at both wheel tires or only at one wheel tire of a set of wheels. The running circle diameter to be turned anew due to tire wear can be determined only inaccurately with conventional measuring devices, especially if the wheel set is not removed. It is an aggrevating circumstance that 1mm wear of the flange necessitates about 2mm of tread surface removal by cutting, so that accurate and simple determination of the flange wear is particularly important if it is to be prevented that through mistakes on the part of the operating personnel valuable wheel tire material is cut off needlessly. This difference in the profile wear, together with the difficult, rated profile, presents great difficulties in measuring wheel sets.

BACKGROUND OF THE INVENTION

In one practiced method of the kind mentioned above, the lathe operator engaged with the reprofiling of the wheels of not disassembled wheel sets lets the wheel set run into the machine and probes with his turning tool for that point on the tread surface which, according to his visual impression, shows the greatest wear. He therefore runs the tool to that wear location which, according to his subjective impression, is most pronounced. In this connection the operator must confine himself in his judgement and adjustment to the tread surface of the wheel and cannot use the flange for this purpose, which however, has special significance as far as the wear is concerned and is therefore decisive for the final new profile.

If considerable flange wear is present, the flange determines the cutting depth required for reprofiling. However, the operator cannot determine this, rather, he takes the tread surface for his orientation. The operator must rely, after several test cuts, on finally producing a completely cut-over profile having an entirely machined, shiny surface. To get to this completely cut-over profile as quickly as possible, there is the temptation for the operator, because he is on piece work, to take cuts as deep as possible, even if this is actually not necessary. In this manner, valuable wheel tire material is cut off needlessly.

Following this, because in the lathe, the diameter differences of the two wheels in the respective measuring circle plane cannot be ascertained, the wheel set must be rolled out of the turning machine and rolled into a measuring machine, by means of which the diameter difference is determined. Subsequently, the wheel set is placed in the turning machine again to make a corrective cut for producing equal diameters at both wheels. In practice, turning machines also have become known which are already equipped with friction-wheel measuring devices for determining the diameters of the wheels of a wheel set. In this way, the rolling-in and out which is necessary for the measurement, after a shiny profile is produced, may be omitted.

In wheel set turning machines working with centers it is also known to determine prior to the reprofiling, by means of a frictionwheel measuring device rolling on the tread surface of each wheel of a wheel set being rolled into turning machines, the actual diameter of the two worn wheels in the measuring circle plane of each wheel. The turning tool is then adjusted to the smallest diameter of the two wheels of a wheel set and the wheels of a set are then reprofiled with this tool adjustment. However, this known method also does not take into account the flange wear, so that one must carefully probe the wear condition of the flange by repeated cuts. This is time-consuming and therefore leads the lathe operator who is on piece work, to adjust the turning tool by his "feel" to so deep a cut that he obtains with a single cut a completely renovated profile and needs to correct only the diameter difference in the second cut. Therefore, this known method is not a solution, either.

It is also known to underpin and thus to fix the bearing boxes of the wheel sets in the turning machine for reprofiling of not disassembled railroad wheel sets. With this arrangement, it is made sure that the axis of rotation of the wheel set to be machined retains a constant position during the machining, as is also the case when turning between centers. It is a disadvantage in this known method that no reference surfaces with the necessary accurate machining and correspondingly accurate dimensional tolerances are provided at the bearing boxes, since the bearing boxes are, as a rule, castings with relatively rough tolerances. While the axis of rotation is thus fixed in its position during the turning operation, due to the support in the bearings, its position is unknown, so that reference to the axis of rotation for the diameter adjustment of the tools is not possible.

In turning between centers, the need to ascertain the diameter difference in a separate measuring operation is eliminated, as the position of the axis as well as the position of the tools relative to the axis are always known. However, it is often difficult to expose the center marks in the assembled wheel sets, since the bearing boxes of the wheel sets must be partly disassembled for this purpose. These center marks also are often damaged, so that it is no longer possible to clamp the wheel set correctly. In addition, only definite axle loads up to a limited maximum value can reasonably be taken up between centers as there is otherwise, for instance, in the case of heavy locomotives, the danger that the center marks and the points of the turning machine are plastically deformed and thus destroyed.

German Patent No. 1,552,335, which corresponds to U.S. Pat. No. 3,518,914, describes a sensor arrangemnt for the tool positioning prior to the copy turning of run-down, unmeasured wheel tires of track vehicles in which set turning machines having separate feed carriages and a copying device. The copying device has a copying feeler arranged on its cross slide and a template arranged on its feed carriage. In this known apparatus a plurality of sensors which may be moved along with the feed carriage is provided, which are positioned with their feeler or sensor points approximately perpendicularly to the original profile and which scan the profile at the worn places independently of each other. Their stroke movements, which are caused by the feed carriage motion and the worn places of the profile, act individually on end switches which are connected in parallel and stop the drive of the feed carriage as soon as all switches remain closed when the wheel set continues to rotate.

These sensor arrangements are used in such wheel set turning machines which machine the wheel set held between centers. Since both cross slides are advanced in the radial direction simultaneously and by the same amount until the last end switch of the two sensor devices remains closed, and since the reference base is known because of the center mounting, both wheels of a set are reprofiled simultaneously to the same diameter. According to this prior art, these sensor devices can thus be used only if the position of the reference base is known and fixed.

OBJECTS OF THE INVENTION

Thus, it is an object of the invention to achieve elimination of the uncertainty in the setting to the finished diameter to be reprofiled, while at the same time the machining time is shortened, for wheel sets which are preferably not disassembled and are not held between centers in the turning machine.

SUMMARY OF THE INVENTION

According to the invention, this problem is solved by the provision that first, a portion of the tread surface width is turned with a respective depth of cut smaller than the cutting depth required for the restoration of the profile and the diameters of the turned portions are determined and compared with each other, whereupon the turning tool assigned to the portion with the smaller diameter is advanced by the amount of cutting depth required for the final reprofiling and the turning tool assigned to the portion with the larger diameter is advanced by the same amount and in addition by half the amount of the diameter difference, before the final profile contour is restored with the turning tools in one cutting operation.

According to a further embodiment of the invention, it is provided that the rollers driving the wheel set hold the wheels at the tread surface and the position of the rollers is varied in the vertical direction until a horizontal plane is tangent to all rollers.

In this manner, one arrives at a method for reprofiling the wheels of railroad wheel sets of the type mentioned above, which fully meets the aforementioned objective of the invention.

If the invention is used, a wheel set can now be reprofiled, particularly in machines operating without centers, in a shorter time with higher precision and with less chip or material removal.

BRIEF FIGURE DESCRIPTION

The method according to the invention, will be explained in further detail in the following, making reference to a diagrammatic sketch, whereby the advantages of the invention will also become apparent.

DETAILED DESCRIPTION OF A PREFERRED EXAMPLE EMBODIMENT

A wheel 1, to be reprofiled, of a wheel set not shown, is driven and supported at the tread surface 2 by a drive roller 3. While the wheel 1, and thereby the not detailed wheel set, rotates, a sensing device similar to the sensing device according to the German Patent No. 1,552,335, comprising for instance an edge sensor, a tread surface sensor, and a flange sensor, is advanced toward the wheel 1 until the edge feeler switches. Care should be taken that each sensor device controls only the carriage supporting the sensor device and exerts no influence on the other carriage. A certain empirical value has been predetermined, which, depending on the usual wear condition of the wheels or sets of wheels may be about 6mm, by which the carriage supporting the edge sensor continues in the direction toward the wheel 1 without the responding of the last flange sensor until then. If the tread surface sensor switches during this travel distance of 6mm without the flange sensor having switched, the carriage traverses the entire 6mm. However, if even the last flange sensor switches, the sensor device will stop the carriage. If, however, the flange sensor which initially contacts the flange as shown in said U.S. Pat. No. 3,518,914; does not switch during these 6mm, the sensor device stops the carriage after the preset 6mm have been traversed whereby the flange sensor has been pushed back for said 6mm to actuate a respectively set limit switch.

Thereupon, the measuring cut of 6mm depth to beyond the desired measuring circle is performed. In this manner, the annular zone 4 is turned out of the wheel 1, so that the measuring surface 5 appears at the tread surface of the wheel of the wheel set. The measuring cut is carried out far enough so that the diameter difference of the two wheels of a wheel set may be meaured in a desired measuring plane which however must be equal for the two wheels. The measuring is done with the measuring wheel of a known friction-wheel measuring device. This can be done, as desired, during the cutting or also after the cutting is interrupted. When in this manner the diameter difference has been determined or it has also been determined that there is no diameter difference or only a permissible diameter difference, the sensing head is swung in again and is advanced with its carriage so far that even the last flange switch operates, if the latter had not yet switched within the 6mm which have been turned in the meantime. As soon as the last flange sensor of a sensing device switches, the sensing device stops the carriage supporting it. Both carriages are now positioned so that the associated turning tools are able to produce a completely new profile in one cut. However, a possible diameter difference cannot be taken into consideration because of the unknown position of the axis of rotation when the carriages are set by the sensor device. However, the position of the axis of rotation relative to the turning tools had been determined by the preceding diameter measurement by means of known friction-wheel measuring devices, so that now a possibly determined diameter difference may be halved and the carriage on the side with the larger diameter may thus be advanced beyond the carriage setting accomplished by means of the sensing device. With this setting, the finish cutting over the entire profile is made, whereupon the new tread surface 6 with the desired reprofiled contour appears. After these operations are completed, the annular zone 7 has been milled out of the wheel 1 in the tread surface region and the annular region 9 has been milled out of the flange region 8.

In a further embodiment of the invention, another possibility is to let the two sensing devices advance with the carriages supporting them, independently of each other, until the last feeler has switched in each sensing device. This stops the corresponding carriages and both are pulled back by an equal and constant amount. In this position of the carriages, the already described measuring cutting is now carried out, so that the diameter difference can again be determined by means of the known friction-wheel measuring devices. If such a diameter difference is found to be outside the permissible tolerance, the difference is halved and is advanced on the side with the larger diameter in addition to the previously retracted distance. With this setting, the last cut is made, whereupon the wheel reprofiling is completed. With this procedure, swinging-in of the feeler devices twice may be avoided.

It is particularly advantageous to perfect the method according to the invention in such a manner that by means of known control devices it is possible to take care that the rollers supporting and driving the wheel set to be reprofiled occupy an operating position such that all rollers are tangent to the same horizontal plane. It can be ensured by this feature that the axis of the wheel set does not occupy an unpermissible oblique position in the machine. Means for adjusting the position of the drive rollers to assume a common tangential plane are disclosed, for example, in U.S. Pat. No. 3,427,519. Means for adjusting the position of the drive rollers to assume a common tangential plane are disclosed, for example, in U.S. Pat. No. 3,345,890 (Dombrowski). The residual oblique position of the axis still remaining if the thus advantageously supplemented method according to the invention is used, now results merely due to the diameter difference of the two worn wheels of a wheel set in the contact zone with the drive rollers. This diameter difference however, is of the order of 1mm according to experience, whereby an inclination of 1:1,400 of the axis may result. The profile distortion resulting from this inclination of the axis during the reprofiling is by far within the permissible profile tolerance and therefore presents no danger.

I claim:

1. In a method for reprofiling the wheels of railroad wheel sets by machining of the wheel profile surface formed by the tread surface and the flange surface of the wheels of a wheel set, on a turning machine, wherein each wheel is frictionally driven at the profile surface in a force transmitting manner by spaced roller means holding the wheel, the improvement comprising the steps of first cutting over a portion of the width of the tread surface of each wheel of a set to a respective cutting depth smaller than the cutting depth required for restoring the profile surface, then determining the diameters of the cut-over portions of the wheels of a set and comparing these diameters with each other, then advancing a first turning tool assigned to the wheel profile surface with the smaller diameter to the cutting depth required for the final reprofiling, and advancing the second turning tool assigned to the wheel profile surface with the larger diameter to the same cutting depth, and additionally advancing said second turning tool by half the amount of the diameter difference, said steps being performed prior to restoring the final profile contour in one cutting operation by the turning tools.

2. The method according to claim 1, wherein the rollers driving the wheel set, support the wheels at the tread surface, and wherein the position of the rollers is varied in the vertical direction until one horizontal plane is tangent to all rollers.

* * * * *